(12) United States Patent
Shinagawa et al.

(10) Patent No.: US 8,160,343 B2
(45) Date of Patent: Apr. 17, 2012

(54) EFFICIENT FEATURES FOR COMPUTER-AIDED DETECTION

(75) Inventors: Yoshihisa Shinagawa, Downingtown, PA (US); Gerardo Hermosillo Valadez, West Chester, PA (US); Bing Jian, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 468 days.

(21) Appl. No.: 12/423,963

(22) Filed: Apr. 15, 2009

(65) Prior Publication Data
US 2009/0262999 A1 Oct. 22, 2009

Related U.S. Application Data

(60) Provisional application No. 61/046,816, filed on Apr. 22, 2008, provisional application No. 61/046,821, filed on Apr. 22, 2008.

(51) Int. Cl.
*G06K 9/00* (2006.01)
(52) U.S. Cl. ...................................................... 382/131
(58) Field of Classification Search ................... 382/131
See application file for complete search history.

(56) References Cited

U.S. PATENT DOCUMENTS

| 7,251,374 B2 | 7/2007 | Niemeyer |
| 7,620,227 B2 * | 11/2009 | Gering et al. ................. 382/128 |
| 7,756,317 B2 * | 7/2010 | Huo et al. ..................... 382/132 |

OTHER PUBLICATIONS

"CAD Eases Breast MRI Analysis", MedicalPhysicsWeb, Jul. 5, 2007, retrieved from: http://medicalphysicsweb.org/cws.../30484.
Chen et al., "A Fuzy C-Means (FCM)-Based Approached for Computerized Segmentation of Breast Lesions in Dynamic Contrast-Enhanced MR Images", Academic Radiology, vol. 13, No. 1, Jan. 2006, pp. 63-72.
Tofts et al., "Estimating Kinetic Parameters From Dynamic Contrast-Enhanced T1-Weighted MRI of a Diffusable Tracer: Standardized Quantites and Symbols", Journal of Magnetic Resonance Imaging 10, pp. 223-232, 1999.

* cited by examiner

*Primary Examiner* — Rodney Fuller
(74) *Attorney, Agent, or Firm* — Peter Withstandley

(57) ABSTRACT

A technology for facilitating computer-aided detection (CAD) includes in one implementation, receiving an enhancement pattern (602) generated from image data. The enhancement pattern is pre-processed to produce an alert level (604, 606, 608). Computationally-intensive analysis may be performed on a region of interest if it corresponds to an enhancement pattern with a high alert level.

9 Claims, 6 Drawing Sheets

EFFICIENT FEATURES FOR COMPUTER-AIDED DETECTION

CROSS-REFERENCE TO RELATED APPLICATIONS

The present application claims the benefit of U.S. provisional application No. 61/046,821 filed Apr. 22, 2008 and U.S. provisional application No. 61/046,816 filed Apr. 22, 2008, the entire contents of which are herein incorporated by reference.

TECHNICAL FIELD

The present disclosure relates to computer-aided detection and more specifically, to efficient features for computer-aided detection.

BACKGROUND

Various imaging systems and tools have been developed to assist physicians, clinicians, radiologists, etc. in evaluating medical images to diagnose medical conditions. For example, computer-aided detection (CAD) tools have been developed for various clinical applications to provide automated detection of medical conditions in medical images, such as colonic polyps and other abnormal anatomical structures such as lung nodules, lesions, aneurysms, calcification, in breast, heart or artery tissue, etc.

Magnetic resonance imaging (MRI) is a medical imaging technique that uses a powerful magnetic field to image the internal structure and certain functionality of a body. MRI is particularly suited for imaging soft tissue structures and is thus highly useful in the field of oncology for the detection of lesions.

Dynamic contrast-enhanced MRI (DCE-MRI) allows for many additional details pertaining to bodily soft tissue to be observed, to further aid in diagnosis and treatment of detected lesions. DCE-MRI may be performed by acquiring a sequence of magnetic resonance (MR) images that span a time before magnetic contrast agents are introduced into the patient's body and a time after the magnetic contrast agents are introduced. By imaging the patient's body sequentially, a set of images may be acquired that illustrate how the magnetic contrast agent is absorbed and washed out from various portions of the patient's body.

This wash-in (i.e. absorption) and wash-out information may be used to characterize various internal structures within the body and provide additional diagnostic information. In malignant lesions, for example, the amount of contrast agent in the tissue increases and then decreases over time, indicated by a wash-in followed by a wash-out enhancement pattern. The enhancement pattern may then be fitted to a pharmacokinetic model from which parameters based on the rates of fluid exchange can be calculated. One example of a pharmacokinetic model is the Tofts model, which fits a model that consists of a linear increase of contrast agent in the blood and an exponential decay representing the leak from the lesion, to model the flow and leakage from the vessel. See P. S. Tofts, G Brix, D. L. Buckley, J. L. Evelhoch, E. Henderson, M. V. Knopp, H. B. W. Larsson, T. Y. Lee, N. A. Mayr, G J. M. Parker, et al., "Estimating kinetic parameters from dynamic contrast-enhanced T I-weighted MRI of diffusible tracer: a common global language for standardized quantities and symbols," *J. Magn. Reson. Imaging,* 10(3):223-232, 1999.

The diagnosis of cancer from MRI data is a difficult problem. A malignant lesion often displays intensity patterns similar to benign tissues and other structures in the field of view. Additional difficulties are posed when an enhancement pattern is associated with a lesion, because a lesion comprises a large number of voxels (i.e. points), each voxel showing a different enhancement pattern. Several methods have been proposed to characterize the enhancement pattern of lesions. However, such conventional methods do not take into account the motion of the contrast agent inside the lesion. For example, a centrifugal motion of enhancement is often seen inside a fibroadenoma that is benign. Conventional methods will produce a wash-in/wash-out enhancement pattern that makes the lesion look malignant, when in fact it is benign. Therefore, there is a need for a new technology that accurately characterizes enhancement patterns to avoid such false positives.

In addition, there is also a need to address the computationally intensive aspects of pharmacokinetic analysis (PKA). PKA typically involves a large number of powerful but computationally heavy features. For example, the Tofts Model described above fits the enhancement pattern to the flow model by iteratively minimizing the difference between the enhancement data and the exponential curve with the current decay parameter. Such an iterative process, as well as other aspects of the analysis, demand tremendous computational resources. Therefore, there is a need for a technology that increases the computational efficiency of CAD systems.

SUMMARY

A technology for facilitating computer aided detection (CAD) is described herein. In one implementation, the CAD technology includes receiving an enhancement pattern generated from image data. The enhancement pattern is pre-processed to generate an alert level. Computationally-intensive analysis may be performed on a region of interest if it corresponds to an enhancement pattern with a high alert level.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present systems and methods and in order to meet statutory written description, enablement, and best-mode requirements. However, it will be apparent to one skilled in the art that the present systems and methods may be practiced without the specific exemplary details. In other instances, well-known features are omitted or simplified to clarify the description of the exemplary implementations of present systems and methods, and to thereby better explain the present system and methods. Furthermore, for ease of understanding, certain method steps are delineated as separate steps; however, these separately delineated steps should not be construed as necessarily order dependent in their performance.

The following description sets forth one or more implementations of systems and methods that facilitate computer aided detection (CAD). One aspect of the present technology efficiently characterizes enhancement patterns to facilitate detection of malignant lesions, advantageously taking into account the motion of the contrast agent inside the lesion. Another aspect of the present technology performs pre-processing of image data to reduce the time complexity of further computationally intensive analysis, such as pharmacokinetic analysis. In one implementation, the present technology generates alert levels that correlate well to the malignancy of the tissue. During the later analysis, computationally heavy features are computed only for regions of interest with high alert levels, thereby enhancing the overall computational efficiency of the CAD technology.

It is noted that, while a particular application directed to analysis of lesions in breast MRI is shown, the description is not limited to the specific embodiment illustrated. The present technology has application to for example, other types of images (e.g., computed tomography (CT) images, ultrasound images, and radio isotope images) and other types of anatomical features, such as the brain, prostate, kidney and liver.

Figure 1:
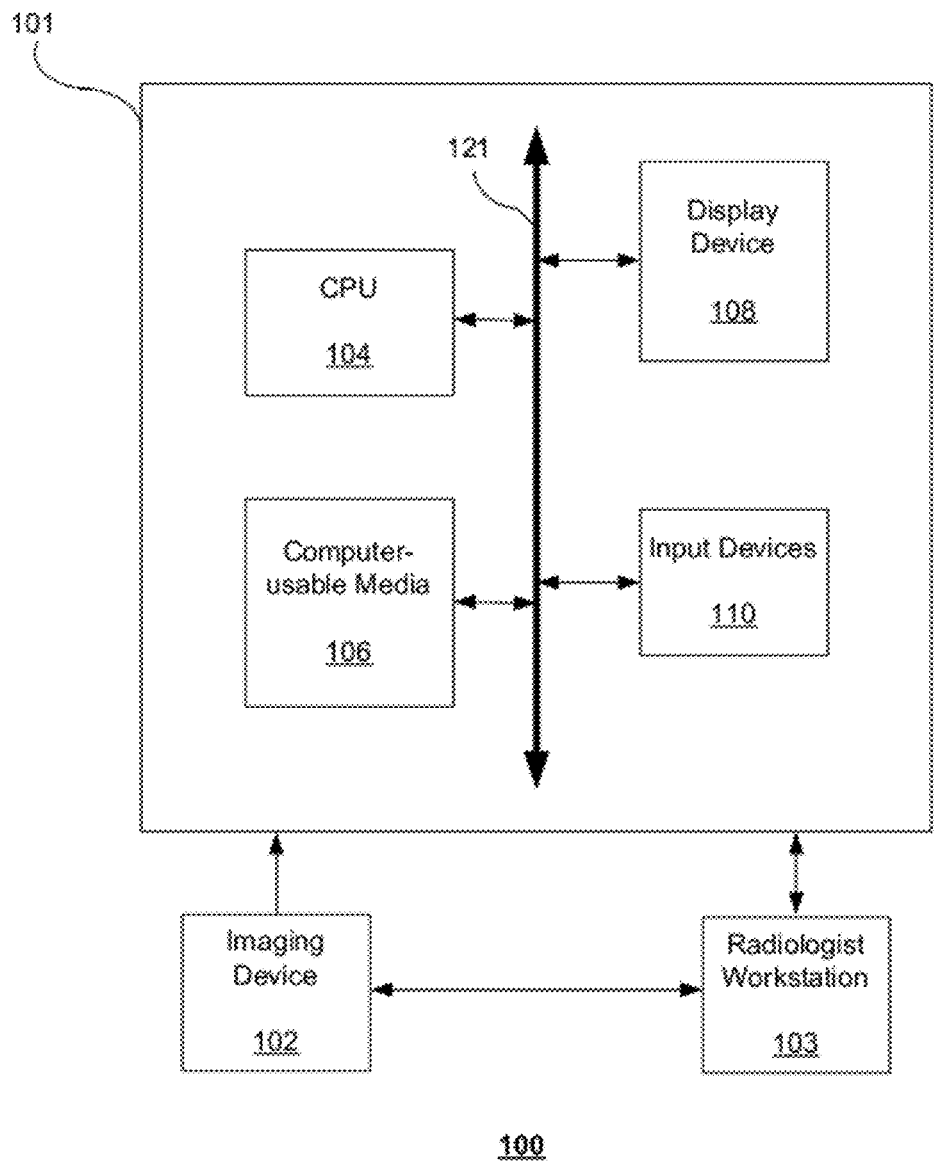
FIG. 1 shows a block diagram illustrating an exemplary CAD system.

FIG. 1 shows a block diagram illustrating an exemplary CAD system 100. The CAD system 100 includes a computer system 101 for implementing the framework as described herein. The CAD system 100 may be further connected to an imaging device 102 and a radiologist workstation 103, over a wired or wireless network. The imaging device 102 may be a radiology scanner such as a MR scanner or a CT scanner.

Computer system 101 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 101 comprises a processor or central processing unit (CPU) 104 coupled to one or more computer-usable media 106 (e.g., computer storage or memory device), display device 108 (e.g., monitor) and various input devices 110 (e.g., mouse or keyboard) via an input-output interface 121. Computer system 101 may further include support circuits such as a cache, power supply, clock circuits and a communications bus.

It is to be understood that the present technology may be implemented in various forms of hardware, software, firmware, special purpose processors, or a combination thereof. In one implementation, the techniques described herein may be implemented as computer readable program code tangibly embodied in computer-usable media 106. Computer-usable media 106 may include random access memory (RAM), read only memory (ROM), magnetic floppy disk, flash memory, and other types of memories, or a combination thereof. The computer-readable program code may be executed by CPU 104 to process images (e.g., MR or CT images) from imaging device 102 (e.g., MRI or CT scanner). As such, the computer system 101 is a general-purpose computer system that becomes a specific purpose computer system when executing the computer readable program code. The computer readable program code is not intended to be limited to any particular programming language and implementation thereof. It will be appreciated that a variety of programming languages and coding thereof may be used to implement the teachings of the disclosure contained herein.

Computer system 101 may also include an operating system and microinstruction code. The various techniques described herein may be implemented either as part of the microinstruction code or as part of an application program or software product, or combination thereof, which is executed via the operating system. Various other peripheral devices, such as additional data storage devices and printing devices, may be connected to the computer system 101.

The radiologist workstation 103 may include a computer and appropriate peripherals, such as a keyboard and display, and can be operated in conjunction with the entire system 100. For example, the radiologist workstation 103 may communicate with the imaging device 102 so that the image data collected by the imaging device 102 can be rendered at the radiologist workstation 103 and viewed on the display. Further, the radiologist workstation 103 may communicate directly with the computer system 101 to access previously processed image data, such as data which has undergone processing by the framework described herein, so that a radiologist can manually verify the results of the framework.

It is to be noted that in the discussion of the following FIGS. 2-6, continuing reference will be made to elements and reference numerals shown in FIG. 1.

Figure 2:
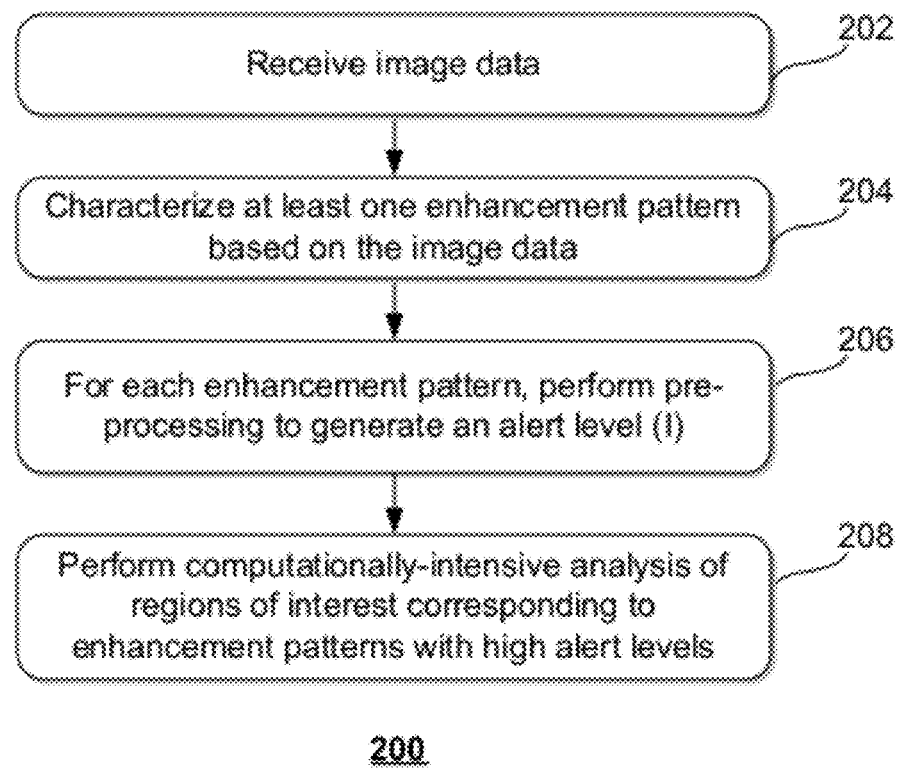
FIG. 2 shows an exemplary method which may be implemented by the CAD system.

FIG. 2 shows an exemplary method 200 which may be implemented by the CAD system 100. At step 202, the CAD system 100 receives image data from, for example, imaging device 102. The image data may be, for example, time-series medical image data acquired during a breast MRI session. The time-series may pertain to a sequence of regular time points (e.g., 1 minute intervals).

The image data may comprise pre-contrast images and post-contrast images. Pre-contrast MR images are taken of the patient before a magnetic contrast agent has been administered, and post-contrast MR images are taken after the contrast agent has been administered. The contrast agent may be a paramagnetic agent (e.g., gadolinium compound), a super-paramagnetic agent (e.g., iron oxide nanoparticles), a diamagnetic agent (e.g., barium sulfate) or any other suitable magnetic agents. The contrast agent may be administered orally, intravenously or by another means. The contrast agent may be selected for its specific magnetic property that enhances the appearance of the anatomy or pathology of interest. By injecting the contrast agent into the patient's blood, vascular tissue may be highly visible in the MRI. Since malignant tumors tend to be highly vascularized, the use of the contrast agent is highly effective for identifying regions suspected of being lesions.

At step 204, the CAD system 100 characterizes at least one enhancement pattern, based on the image data. An enhancement pattern may represent the changes in the observed brightness intensity (or enhancement value) of the image caused by the contrast agent. In one implementation, one enhancement pattern may correspond to changes in enhancement value of one voxel in the image. Alternatively, one enhancement pattern may correspond to representative changes in enhancement value of a plurality of voxels within a region of interest in the image.

Figure 3:
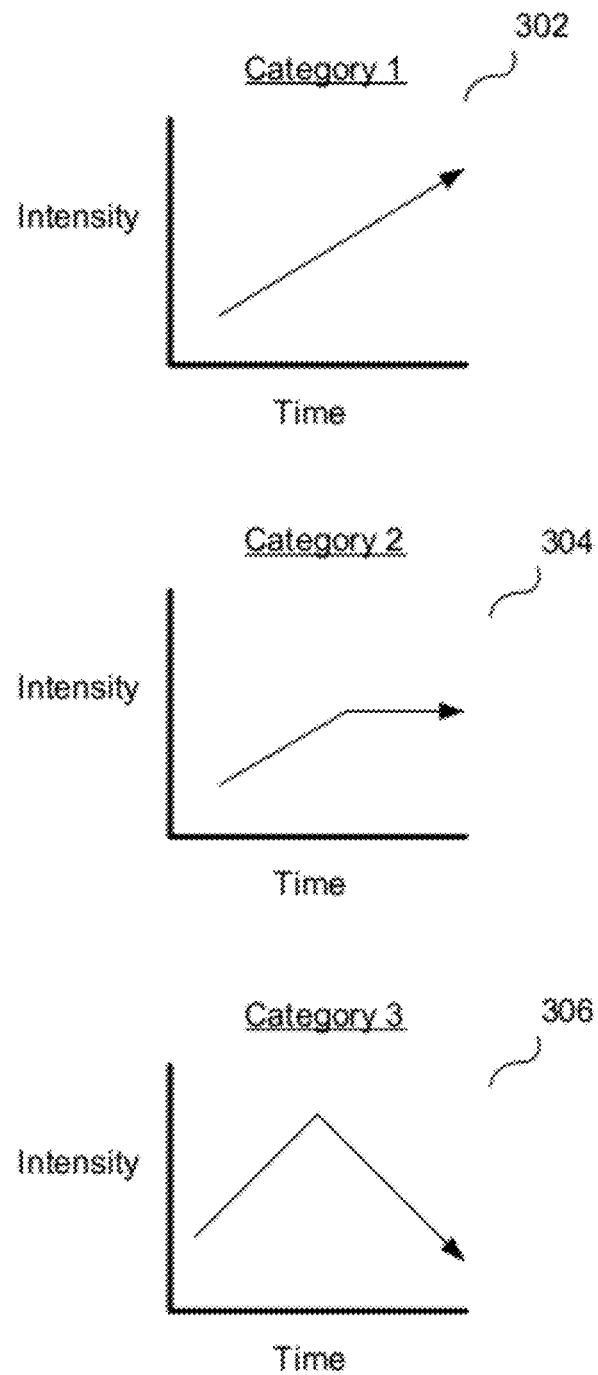
FIG. 3 is a set of exemplary graphs showing enhancement patterns for various BIRADS classifications.

The enhancement patterns provide significant diagnostic information by showing the absorption and wash-out profiles of the given region of interest. Malignant tissue will usually take up contrast more quickly because the tumor vascularity is abnormal, and therefore show a rapid absorption followed by a rapid wash-out. FIG. 3 shows a set of enhancement patterns (302, 304, 306) for various breast imaging reporting and data systems (BIRADS) classifications. BIRADS is a system that has been designed to classify regions of interest that have been manually detected using conventional breast lesion detection techniques such as mammography and breast ultrasound. Under this approach, there are six categories of suspicious regions. Category 0 indicates an incomplete assessment. If there is insufficient data to accurately characterize a region, the region may be assigned to Category 0. A classification as Category 0 generally implies that further imaging is necessary. Category 1 indicates normal healthy breast tissue. Category 2 indicates benign or negative. In this category, any detected masses such as cysts or fibroadenomas are determined to be benign. Category 3 indicates that a region is probably benign, but additional monitoring is recommended. Category 4 indicates a possible malignancy. In this category, there are suspicious lesions, masses or calcifications, and a biopsy is recommended. Category 5 indicates that there are masses with an appearance of cancer and biopsy is necessary to complete the diagnosis. Category 6 is a malignancy that has been confirmed through biopsy.

Exemplary implementations of the present technology may be able to characterize a given region according to the above BIRADS classifications based on the image data. To perform this categorization, the wash-in (absorption) and wash-out profiles, as gathered from the post-contrast MRI sequence, for each given region may be compared against a predetermined understanding of absorption and wash-out profiles.

For example, with reference to FIG. 3, enhancement pattern 302 shows the intensity increasing over time with little to no decrease during the observed period. This behavior may correspond to a gradual or moderate absorption with a slow wash-out. This may be characteristic of normal breast tissue and accordingly, regions exhibiting this profile may be classified as Category 1. Enhancement pattern 304 shows the intensity increasing moderately and then substantially plateau. This behavior may correspond to a moderate to rapid absorption followed by a slow wash-out. This may characterize normal breast tissue or a benign mass and accordingly, regions exhibiting this profile may be classified as Category 2. Enhancement pattern 306 shows the intensity increasing rapidly and then decreasing rapidly. This behavior may correspond to a rapid absorption followed by a rapid wash-out. While this behavior may not establish a malignancy, it may raise enough suspicion to warrant a biopsy. Accordingly, regions exhibiting this profile may be classified as Category 3.

Other wash-in and wash-out profiles may be similarly established for other BIRADS categories. In this way, DCE-MRI data may be used to characterize a given region according to the BIRADS classifications. This and potentially other criteria, such as size and shape, may thus be used to identify regions of interest.

Figure 4:
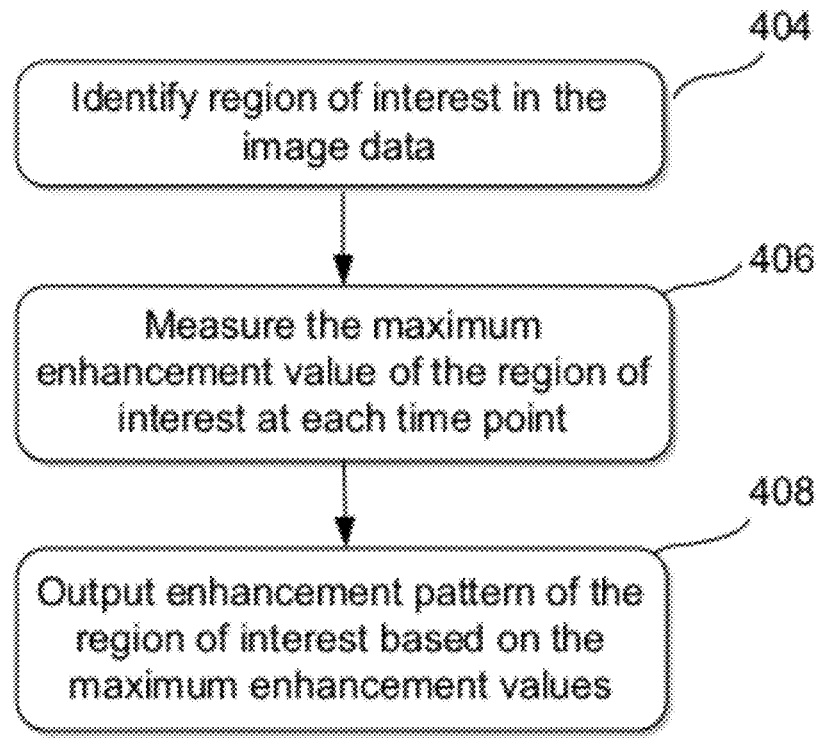
FIG. 4 shows an exemplary enhancement pattern characterization method which may be implemented by the CAD system.

FIG. 4 illustrates a possible implementation of step 204 of FIG. 2, but the present technology is not limited thereto. It is possible that other characterization methods may be used instead of or in addition to the method of FIG. 4. In addition, characterization of lesions in a breast MRI is shown as an example of how the method of characterization may be performed. However, it is to be understood that these techniques may be performed on other anatomical structures.

At step 404, one or more regions of interest in the image data are identified. A region of interest is a potentially malignant lesion, tumor or mass in the patient's body (e.g., breast), and may be represented by one or more voxels in the image. The region of interest may be automatically detected by using a computer-aided detection technique, such as one that detects points where the increase in voxel intensity is above a certain threshold.

At step 406, the maximum enhancement value of the region of interest at each time point may be measured. For example, for each image taken at a particular time point, the CAD system 100 systematically examines each voxel in the region of interest, and selects the highest enhancement value of the voxels to represent the enhancement value of the region of interest at that time point. The maximum enhancement values obtained from the different time points may then be used to generate an enhancement pattern, such as shown in FIG. 5.

At step 408, the enhancement pattern for the region of interest is output. The enhancement pattern may be stored in memory or storage of a computer system, or displayed as an image on a display of a computer system. It is to be understood that steps 404, 406 and 408 may be repeated for each region of interest in the image data.

Figure 5:
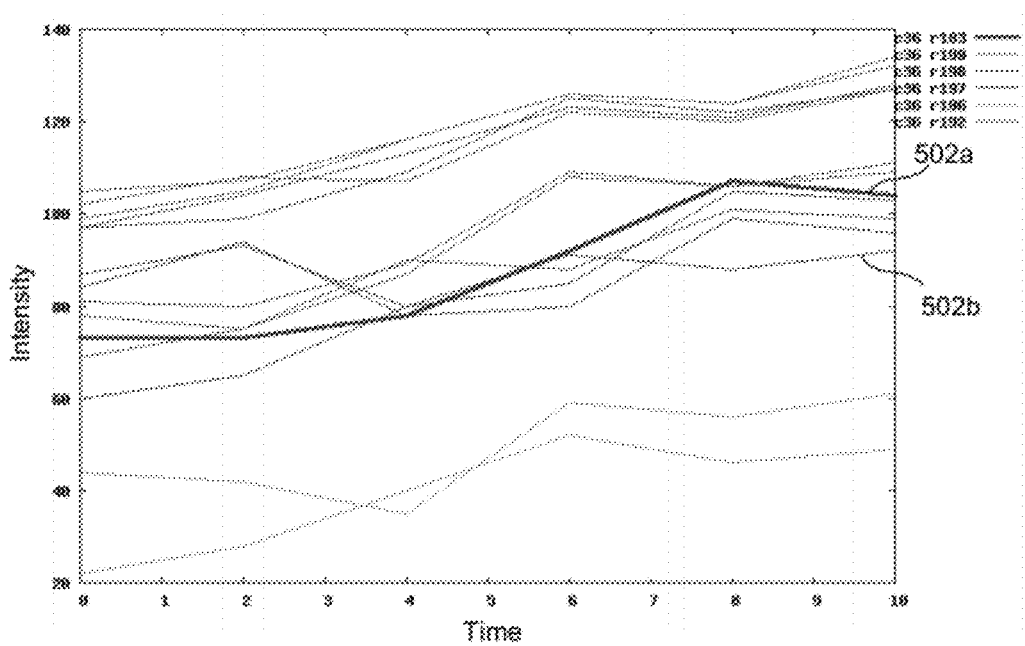
FIG. 5 shows a set of exemplary enhancement patterns which may be generated by one implementation of the CAD system.

FIG. 5 shows exemplary enhancement patterns 502 for different regions of interest, for purposes of illustration. Enhancement pattern 502a characterizes tissue that is most likely to be a malignant lesion. The intensity is shown to increase rapidly, and then decrease. This behavior may correspond to strong absorption, followed by a strong wash-out, which is typical of malignant tissues. In comparison, enhancement pattern 502b, for example, which does not show a strong absorption and wash-out, characterizes tissue that is likely to be normal or benign (i.e. with a low likelihood of malignancy).

By selecting, at different time points, the maximum intensity values in a region of interest to represent its enhancement values, the present technology takes into account motion of the contrast agent within the region of interest. As discussed above, one of the problems of detecting malignant lesions arises because a lesion is represented by a number of voxels (i.e. points), and each voxel may show a different enhancement pattern. The contrast agent may move within the region of interest, resulting in the maximally enhancing voxel moving over time. For example, a centrifugal motion of enhancement is often seen inside a fibroadenoma that is benign.

Conventional methods will produce a wash-in/wash-out pattern that makes the lesion malignant-looking, when in fact it is not (i.e. false positive). By choosing the maximum intensity at each time point to characterize the enhancement pattern of the region of interest, the present technology effectively and efficiently avoids such false positives. For example, if the lesion is a benign fibroadenoma with centrifugal motion of enhancement, a strong wash-out is not observed and this successfully avoids it being classified as a malignant lesion. The characterization may be further refined by tracking the motion of the maximally enhancing voxels across time points. The motion information will provide additional details of the kinetics of the contrast agent within the tissue, which may be pertinent for diagnostic purposes.

Figure 6:
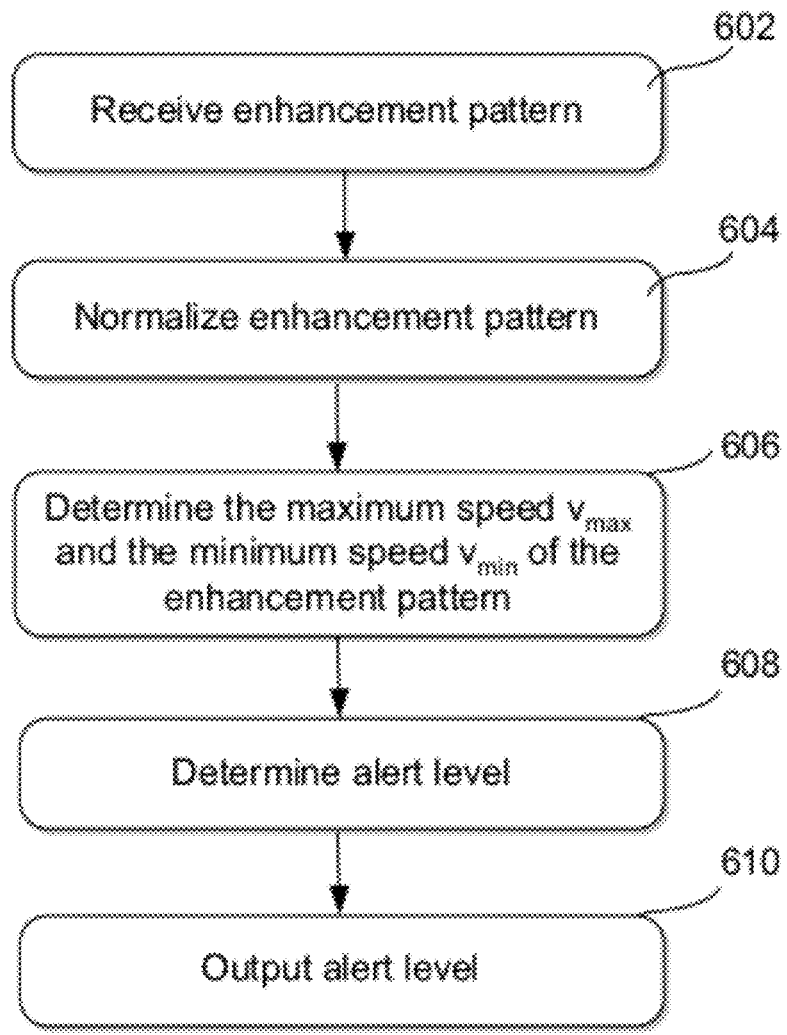
FIG. 6 shows an exemplary pre-processing method which may be implemented by the CAD system.

Referring back to FIG. 2, at step 206, the CAD system 100 may perform pre-processing on the image data to generate an alert level (I) for the region of interest. The alert level may serve to indicate the likelihood of malignancy of the corresponding region of interest. FIG. 6 provides a possible implementation of step 206 of FIG. 2, but the present technology is not limited thereto. It is possible that other pre-processing methods may be used instead of or in addition to the method of FIG. 6.

Referring to FIG. 6, at step 602, at least one enhancement pattern is received. The enhancement pattern may be generated by step 204 as described above. It is understood that other types of enhancement patterns generated by other methods may also be received.

At step 604, the enhancement patterns may be normalized to avoid scale dependency issues. In one implementation, the enhancement values are normalized to lie in the range [0, 1]. For example, if the maximum enhancement value of the image is M, then dividing the enhancement value by M provides the desired normalization to the [0, 1] interval.

At step 606, the maximum enhancement speed ($v_{max}$) and the minimum enhancement speed ($v_{min}$) are determined for each enhancement pattern. The enhancement speed over a time interval (t) may be obtained by dividing the change in enhancement (or observed intensity) by the time interval (t). The enhancement speed is positive during a wash-in, and negative during a wash-out. In one implementation, $v_{min}$ is determined using only the latter half of the enhancement pattern where a wash-out is more likely to occur. Computational robustness is advantageously enhanced since it avoids considering spurious wash-outs occurring in the earlier half of the enhancement pattern. Further, $v_{min}$ may be reset to zero when an increase in enhancement is observed after $v_{min}$ is determined. This avoids considering the current speed as $v_{min}$ when fluctuations are observed.

At step 608, the alert level (I) is computed for each enhancement pattern. In one implementation, the alert level (I) is computed by evaluating the equation: $I = v_{max}^3 - v_{min}$. The alert level is generally higher if there is more wash-in and more wash-out, thereby corresponding to higher likelihood of malignancy. Further, the alert level advantageously takes into account the nonlinear relationship between the wash-in and wash-out by approximating it by a cubic function. Other types of equations based on the maximum and minimum enhancement speeds are also possible. For example, the equation may be a polynomial function, a square root function, a logarithmic function or an exponential function of $v_{max}$ and $v_{min}$, or a combination thereof.

At step 610, the alert level for the enhancement pattern is output. The alert level may be stored in memory or storage of a computer system, or displayed as an image on a display of a computer system. It is to be understood that steps 602-610 may be repeated to generate an alert level for each enhancement pattern.

Referring back to FIG. 2, at step 208, the CAD system 100 may proceed to perform computationally-intensive analysis on regions of interest with high alert levels. An alert level may be deemed high when it is over a certain pre-determined threshold value (e.g., 0.5). Since the alert level correlates well with the malignancy of the tissue, detection accuracy is not sacrificed. Computational speed is greatly improved because such computationally intensive operations are computed only for suspicious voxels or regions of interest but not tissues that are benign. In addition, by using only a single alert value to represent the likelihood of malignancy of a region of interest, the present technology avoids the complexity involved in managing multiple threshold values for a single region of interest.

Computationally intensive analysis includes both dynamic analysis (e.g., pharmacokinetic analysis) and non-dynamic analysis. Pharmacokinetic analysis may include compartmental or heuristic techniques. Compartmental techniques attempt to describe the microscopic view of the tissues as a set of compartments and then model the interaction between these compartments with respect to the entry and exit of the contrast agent. Heuristic techniques attempt to model the wash-in and wash-out phenomena and quantify the extents and rates of the same. By fitting the acquired data to a pharmacokinetic model, parametric values may be displayed to allow a more in-depth depiction of the wash-in and wash-out contrast kinetics of the contrast agent within lesions. Calculated parameters may then be used to generate color-encoded images that aid in the visual assessment and diagnosis of lesions.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for automated or semi-automated image analysis in a computer-aided detection system, the method performed by the computer comprising the steps of:
    (a) receiving, by a processor in a computer system, at least one enhancement pattern generated from image data, the enhancement pattern corresponding to a region of interest in the image data;
    (b) pre-processing, by the processor, the enhancement pattern to generate an alert level (I), wherein pre-processing further comprises normalizing, by the processor, the enhancement pattern; and
    (c) performing, by the processor, computationally-intensive analysis of the region of interest if the region of interest corresponds to an enhancement pattern with a high alert level.

2. The method of claim 1 wherein the step (b) further comprises:
    (i) determining, by the processor, a maximum enhancement speed ($v_{max}$) of the enhancement pattern; and
    (ii) determining, by the processor, a minimum enhancement speed ($v_{min}$) of the enhancement pattern.

3. The method of claim 2 wherein the step (ii) comprises determining, by the processor, the minimum enhancement speed ($v_{min}$) based on a later half of the enhancement pattern.

4. The method of claim 2 wherein the step (b) further comprises evaluating, by the processor, a function of the $v_{max}$ and the $v_{min}$.

5. The method of claim 4 wherein the function comprises $I = v_{max}^3 - V_{min}$.

6. The method of claim 4 wherein the function comprises a polynomial function, a square root function, a logarithmic function, an exponential function, or a combination thereof.

7. The method of claim 1 wherein the step (c) comprises fitting, by the processor, the enhancement pattern to a pharmacokinetic model.

8. The method of claim 1 further comprises: (d) characterizing, by the processor, the enhancement pattern based on the image data.

9. The method of claim 8 wherein the step (d) comprises measuring, by the processor, a maximum enhancement value of the region of interest at each time point.

* * * * *